(12) United States Patent
Wang et al.

(10) Patent No.: US 8,056,427 B2
(45) Date of Patent: Nov. 15, 2011

(54) ADJUSTABLE FACE TOOL FOR POSITIONING A FREE MOTION HEADFORM

(75) Inventors: Jenne-Tai Wang, Rochester, MI (US); Mark O. Neal, Rochester, MI (US); Peter J. Gareau, Warren, MI (US); James E. Williamson, Clarkston, MI (US); Alexander Millerman, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 454 days.

(21) Appl. No.: 12/402,620

(22) Filed: Mar. 12, 2009

(65) Prior Publication Data

US 2010/0229663 A1    Sep. 16, 2010

(51) Int. Cl.
*G09B 23/32* (2006.01)

(52) U.S. Cl. ...................................... 73/866.4; 73/12.04

(58) Field of Classification Search ...... 73/12.04–12.07, 73/866.4
See application file for complete search history.

(56) References Cited

U.S. PATENT DOCUMENTS

| | | | | |
|---|---|---|---|---|
| 129,086 | A * | 7/1872 | Benda | 446/391 |
| 3,010,223 | A * | 11/1961 | Alderson | 434/267 |
| 3,610,486 | A * | 10/1971 | Kunzmann | 223/66 |
| 3,973,840 | A * | 8/1976 | Jacobs et al. | 352/86 |
| 4,691,556 | A * | 9/1987 | Mellander et al. | 73/12.01 |
| 4,802,857 | A * | 2/1989 | Laughlin | 434/265 |
| 5,334,073 | A * | 8/1994 | Tilbor et al. | 446/308 |
| 5,340,059 | A * | 8/1994 | Kanigowski | 244/121 |
| 5,589,651 | A * | 12/1996 | Viano et al. | 73/866.4 |
| 5,593,306 | A * | 1/1997 | Kohnke | 434/267 |
| 6,023,984 | A * | 2/2000 | Mazur et al. | 73/865.3 |
| 6,109,921 | A * | 8/2000 | Yau | 434/100 |
| 6,206,703 | B1 * | 3/2001 | O'Bannon | 434/274 |
| 6,522,998 | B1 * | 2/2003 | Mazur et al. | 703/8 |
| 6,691,585 | B2 * | 2/2004 | Ahn | 73/866.4 |
| 6,758,717 | B1 * | 7/2004 | Park et al. | 446/391 |
| 7,216,557 | B2 * | 5/2007 | David et al. | 73/865.9 |
| 7,508,530 | B1 * | 3/2009 | Handman | 356/614 |
| 7,644,504 | B2 * | 1/2010 | Verdiyan et al. | 33/286 |
| 7,789,810 | B2 * | 9/2010 | Le | 482/83 |
| 7,988,452 | B2 * | 8/2011 | Eiwen et al. | 434/270 |
| 2002/0038968 | A1 * | 4/2002 | Maier et al. | 297/253 |
| 2002/0083783 | A1 * | 7/2002 | Ahn | 73/866.4 |
| 2002/0157450 | A1 * | 10/2002 | Hutchenreuther et al. | 73/11.04 |
| 2005/0056104 | A1 * | 3/2005 | David et al. | 73/865.3 |
| 2005/0065757 | A1 * | 3/2005 | White | 703/8 |
| 2005/0066705 | A1 * | 3/2005 | Choi | 73/12.09 |
| 2008/0313914 | A1 * | 12/2008 | Verdiyan et al. | 33/286 |
| 2010/0038891 | A1 * | 2/2010 | Welch et al. | 280/732 |
| 2010/0291522 | A1 * | 11/2010 | Cook et al. | 434/265 |

* cited by examiner

*Primary Examiner* — David A. Rogers
(74) *Attorney, Agent, or Firm* — Quinn Law Group, PLLC

(57) ABSTRACT

An adjustable head tool (AHT) is configured for positioning a free motion headform (FMH) having a regulated FMH backoff requirement prior to an impact between the FMH and a target surface having a target point. The AHT has a built-in or a variable backoff angle relative to the position of the target point, and includes a cranial portion and an adjustable facial template. The cranial portion encloses a linkage assembly, and the facial template has one or more facial features. A rotary dial translates the facial template with respect to the cranial portion to maintain the regulated FMH backoff requirement. The cranial portion includes a forehead impact zone having a first set of demarcations, and the rotary dial has a second set of demarcations corresponding to the first set of demarcations. The dial is set so the second set of demarcations matches the first set during positioning of the AHT.

15 Claims, 8 Drawing Sheets

ADJUSTABLE FACE TOOL FOR POSITIONING A FREE MOTION HEADFORM

TECHNICAL FIELD

The present invention relates generally to vehicle crash testing devices and methodologies, and in particular to the positioning of an adjustable free motion headform during preparation for or set up of a vehicle crash test.

BACKGROUND OF THE INVENTION

The National Highway Traffic Safety Administration (NHTSA) has a legislative mandate under Title 49 of the United States Code, Chapter 301, Motor Vehicle Safety, to issue Federal Motor Vehicle Safety Standards (FMVSS) and Regulations to which manufacturers of motor vehicle and equipment items must conform and certify compliance. The overarching goal of the FMVSS is a reduction in both the number and the resultant severity of occupant injuries during a vehicle collision. Of these standards and regulations, FMVSS 201 in particular requires that passenger cars and certain other designated vehicles provide at least a specified minimal level of protection when a head of a vehicle occupant strikes or encounters a stationary structure within the vehicle interior. To facilitate such testing, model and/or dummy heads, commonly referred to as free motion headforms or FMH, are subjected to controlled impact testing in accordance with a rigid set of standards.

In order to comply with FMVSS 201, manufacturers enact precisely controlled internal testing procedures. Typically, to measure and evaluate the end effect of various simulated vehicle collisions, an FMH is connected to an impactor device, cylindrical piston, or launch arm and propelled toward a target point on a test surface. The targeted test surface is an interior structure or surface of a vehicle interior, e.g., a headliner, A-pillar, B-pillar, and the like. To ensure meaningful test data, the parameters for set up and execution of an FMVSS201 test should be precisely defined and repeatable. However, the process of positioning an FMH is somewhat involved, and positioning in a precise and repeatable manner can be difficult using conventional positioning tools and methodologies. As a result, some level of positional variation can be introduced during crash test set up by the bias and/or relative skill level of the individual operators, the equipment/tools used during the test setup, and the organizations responsible for conducting FMVSS201 tests for a given vehicle model.

SUMMARY OF THE INVENTION

Accordingly, a three-dimensional (3D) adjustable head tool, abbreviated AHT hereinafter for simplicity, provides minimal positional variation of a free motion headform (FMH) during set up or preparation for a vehicle crash test. The AHT is used to determine required angular data for setting or positioning a launch arm of the test apparatus, with the FMH used during the actual crash test being connected to the launch arm only after all measurements have first been determined and verified using the AHT. The AHT includes a main cranial portion and an adjustable facial template having a backoff angle, as that term is defined and used in FMVSS201. In accordance with the present version of FMVSS 201, the backoff angle can be 5 degrees or 10 degrees, depending on the application. However, the actual backoff angle is not intended to be limited to the specific backoff angles called out in that standard. Additionally, the backoff angle can be fixed or built-in according to one embodiment, or it can be selectable or variable in accordance with another embodiment, each of which will be explained in detail hereinbelow.

The facial template is selectively adjusted as needed during set up of the launch arm, and prior to a crash test, in order to maintain a predetermined translation of the facial template with respect to the cranial portion, for example using a positioning mechanism configured as a rotary dial. The AHT when used as set forth herein thus helps crash test operators achieve governmentally-sanctioned positional requirements in a repeatable manner by minimizing variation in positional settings of the FMH.

In particular, an AHT is adapted for positioning an FMH prior to conducting a vehicle crash test. The cranial portion of the AHT at least partially encloses an adjustable linkage assembly linking the facial template of the AHT to a positioning mechanism such as a rotary dial. The exemplary rotary dial can be used to selectively position or translate the facial template with respect to the cranial portion to thereby achieve any regulated FMH backoff requirements.

The facial template itself is contoured or configured as a human facial model having at least one facial feature, e.g., a nose, a lip, a chin, etc. The rotation of the dial translates the facial template with respect to the intended impact point on the cranial portion in order to achieve the specified backoff requirement of FMVSS 201. The cranial portion includes a designated forehead impact zone (FIZ), which has an identical external contour as the forehead impact zone of any FMH later used in the conducting of the actual crash test. The FIZ should be constructed of transparent plastic or other transparent material in order to allow viewing of the various target points through the FIZ from the rear of the AHT. The FIZ has a first set of demarcations, and the rotary dial has a second set of demarcations corresponding to the first set of demarcations.

Positioning of an FMH using the AHT can be accomplished by selecting a primary impact point of the FIZ on the cranial portion of the AHT, placing the primary impact point of the AHT in contact with a target point on the vehicle surface to be impacted during the crash test, and then rotating the AHT with respect to the vehicle surface while the primary impact point of the AHT remains in constant contact with the primary target point. Rotation of the AHT continues until a designated secondary impact point of the template portion of the AHT also contacts the vehicle surface, a condition referred to herein as simultaneous contact.

A preliminary vertical angular measurement of the AHT is then taken at the primary impact point, for example using an inclinometer or other suitable means. Thereafter, the AHT is connected to a launch arm used in actual crash testing, with the launch arm set to the preliminary vertical angle. To retain a required translation of the facial template, the facial template is adjusted as needed using the dial, i.e., by setting the dial to a demarcation corresponding to that of the impact point as demarcated on the FIZ. Once the AHT is positioned or set in this manner and the launch arm is adjusted or iterated for a valid test condition, the AHT can be replaced with the FMH, and the crash test can be conducted in the usual manner.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
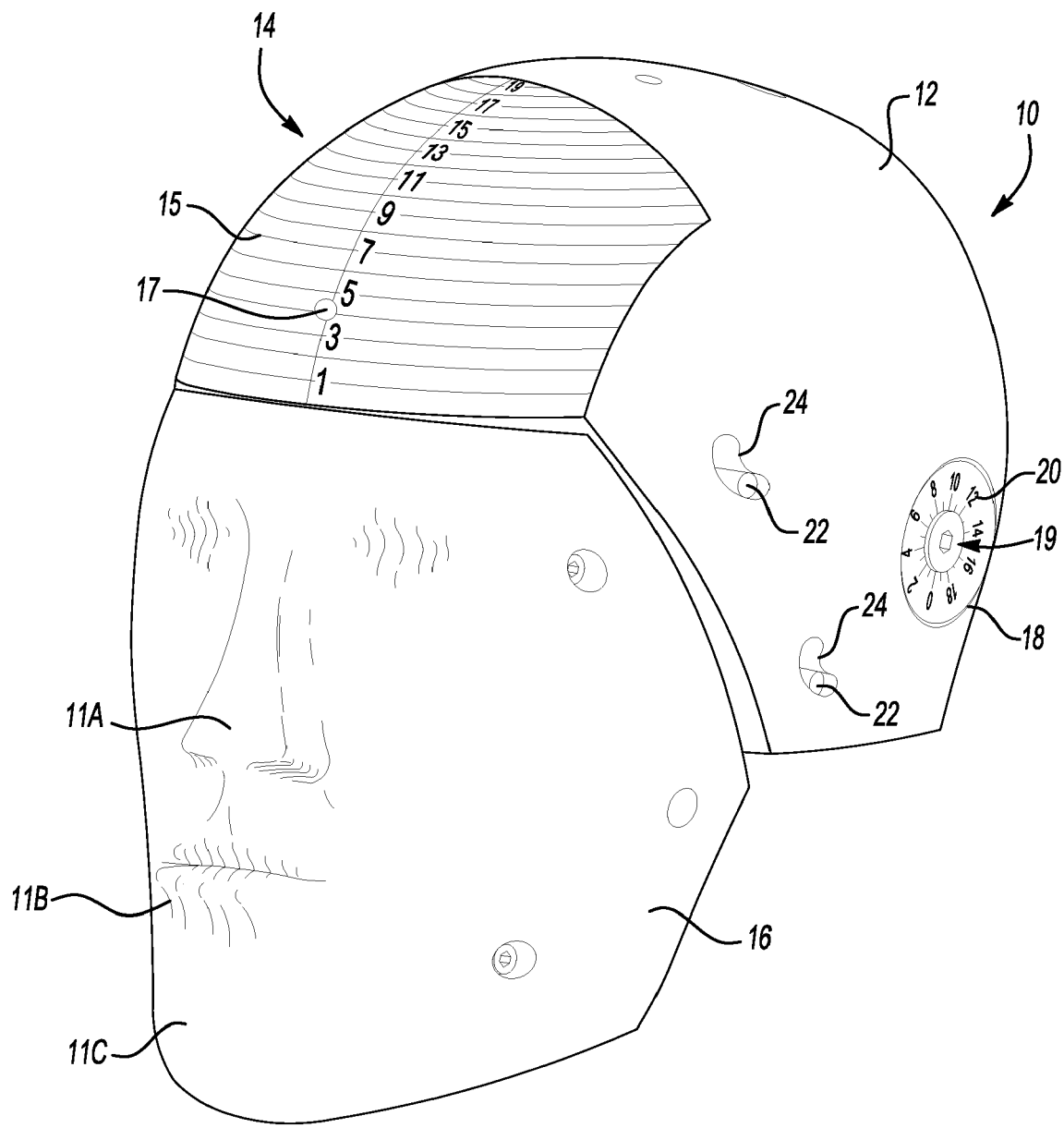
FIG. 1 is a perspective view of a three-dimensional (3D) adjustable head tool (AHT) having an adjustable facial template in accordance with the invention.

Referring to the drawings, wherein like reference numbers correspond to like or similar components throughout the several figures, and beginning with FIG. 1, a three-dimensional (3D) adjustable head tool (AHT) 10 is provided for use in the set up and positioning of a free-motion headform (FMH) (not shown) used in a vehicle crash test. The AHT 10 is suitably configured as a federally-prescribed test component as set forth in 49 C.F.R. §572(L). Within the scope of the invention, the AHT 10 includes a main portion or a cranial portion 12, and an adjustable template portion or a facial template 16. As shown in the embodiment of FIG. 1, the facial template 16 is configured to include one or more human facial features, such as a nose portion 11A, a lip or mouth portion 11B, and/or a chin portion 11C, for reasons that will be made clear below.

The facial template 16 is connected to the cranial portion 12 via an adjustable linkage assembly 34, which is described below with reference to FIGS. 4 and 5. The linkage assembly 34 includes a plurality of guide pins 22 that are moveably disposed within a respective set of guide slots 24 defined by, formed in, or operatively connected to the cranial portion 12. The geometry of the guide slots 24 ensures the proper operation and accuracy of the AHT 10, as it ultimately determines the translation path of the facial template 16. Exemplary mathematical models for the guide slots 24 will be discussed later hereinbelow with reference to FIGS. 6A and 6B.

The AHT 10 further includes the positioning mechanism or rotary dial 18 noted above, which is rotatable in conjunction with a cam shaft 19 of a cam assembly (see FIG. 5) having settings or demarcations 20. A corresponding set of impact zone settings or demarcations 15 is provided on a designated forehead impact zone or FIZ 14 of the cranial portion 12, such that the dial 18 can be set to correspond to a particular portion of the FIZ 14 as marked by a forehead impact point 17 in order to retain a predetermined translation of the facial template 16 with respect to the cranial portion 12, as described below.

Figure 2A:
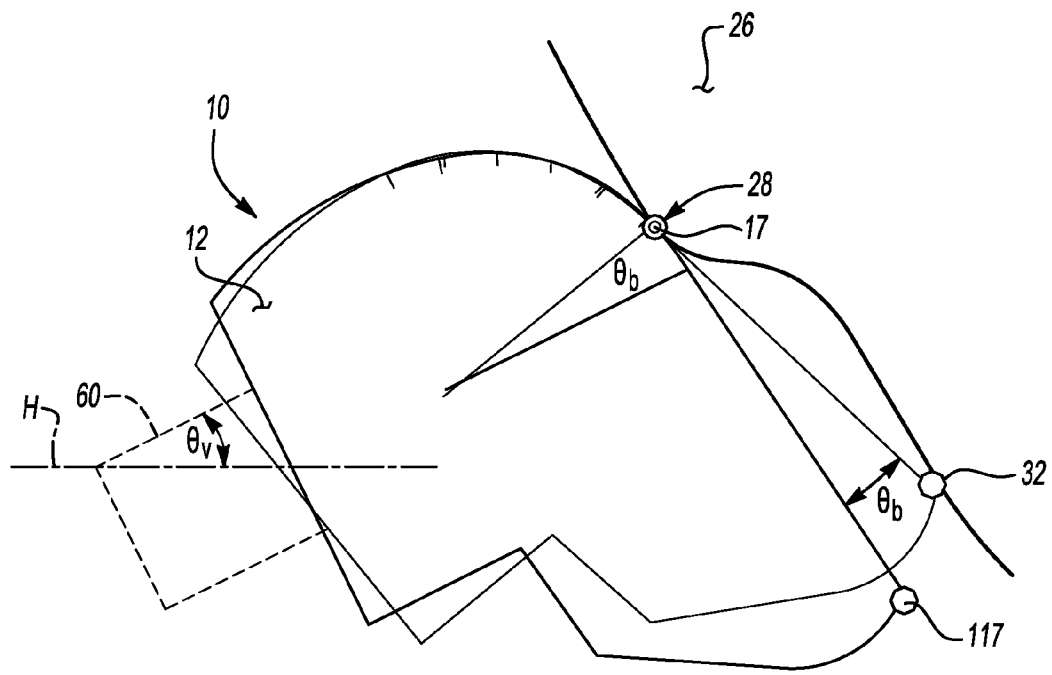
FIG. 2A is a schematic illustration of the 3D AHT of FIG. 1 and an exemplary target vehicle surface.
Figure 2B:
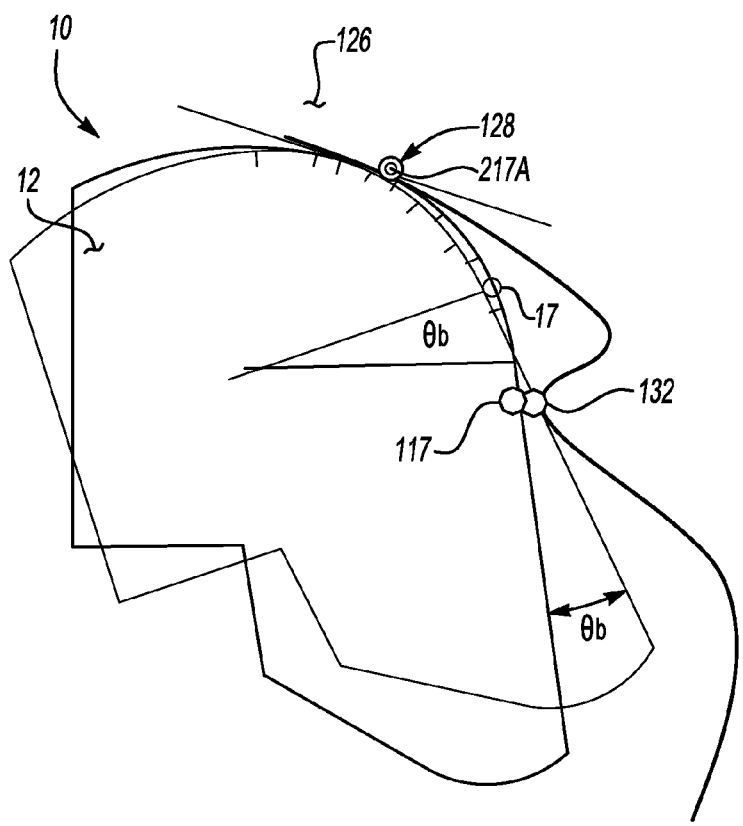
FIG. 2B is a schematic illustration of the 3D AHT of FIG. 1 and another exemplary target vehicle surface.
Figure 3:
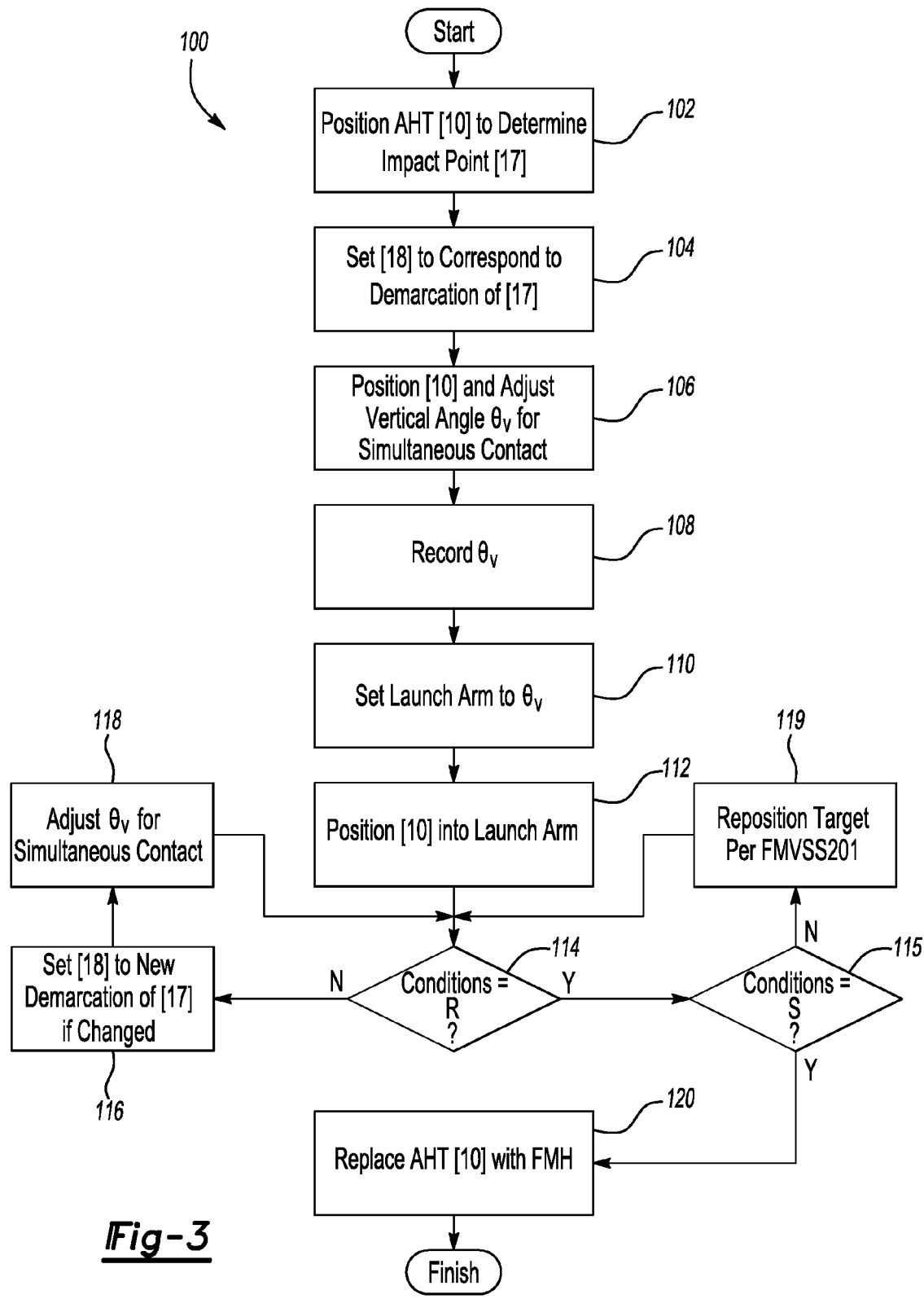
FIG. 3 is a graphical flow chart describing a method for positioning an FMH using the 3D AHT of FIG. 1.

Referring to FIG. 3, and with particular reference to the structure shown in FIGS. 2A and 2B, a process or a method 100 is provided for positioning an FMH (not shown) in preparation for a crash test using the AHT 10 of FIG. 1. At step 102 of FIG. 3, the AHT 10 is manually positioned with respect to the targeted vehicle surface 26, 126 in order to locate the forehead impact point 17. That is, the AHT 10 is manually positioned such that a primary target point 28, 128 on the respective vehicle surface 26, 126 is contacted by the designated forehead impact point 17 of the AHT 10, usually the lowest usable or unobstructed point on the FIZ 14. The vehicle surface 26 can be any flat or contoured target surface of a vehicle interior that is likely to be impacted as a result of a collision, e.g., A or B pillars, side rails, headliners, etc. After positioning the AHT 10, the method 100 proceeds to step 104.

At step 104, the dial 18 is set to a demarcation 20 that corresponds to the demarcation 15 of the forehead impact point 17 in order to initially maintain the translation of the facial template 16 relative to the cranial portion 12, thus retaining any regulated FMH backoff requirement as determined by FMVSS201 as described above. The method 100 then proceeds to step 106.

At step 106, the AHT 10 is manually positioned or rotated as needed to adjust a preliminary vertical angle ($\theta_V$) with respect to the horizontal, i.e., line H, as shown in FIG. 2A, so that the FIZ 14 and a point on the facial template 16, referred to hereinafter as a secondary target point 32, 132 for clarity, each contact the vehicle surface 26, 126 in a simultaneous manner, as indicated by the notation "simultaneous contact" in FIG. 3. The point on the facial template 16 making such contact is referred to herein as the secondary impact point 117, e.g., the chin portion 11C as shown in FIG. 2A or the nose portion 11B as shown in FIG. 2B, or any other suitable part or surface of the facial template 16. The location or position of the forehead impact point 17 could change to that of the impact point 17A during this adjustment, as shown in FIG. 2B. The method 100 then proceeds to step 108.

At step 108, the preliminary vertical angle ($\theta_V$) of the AHT 10 is measured and recorded. For example, an inclinometer 60, as shown schematically in FIG. 2A, can be connected to the AHT 10, and the preliminary vertical angle ($\theta_V$) is measured and recorded. The method 100 then proceeds to step 110.

At step 110, a piston or a launch arm 70 (see FIG. 4) for launching the FMH during the actual crash test is programmed or set using the preliminary vertical angle ($\theta_V$) previously determined at step 108. After step 110 is complete, the method 100 proceeds to step 112.

At step 112, the AHT 10 is connected to or positioned into the launch arm 70 (see FIG. 4), and the preliminary vertical angle ($\theta_V$) is verified. Any necessary adjustment or iteration of the launch arm 70 can occur at this point. The method 100 then proceeds to step 114.

At step 114, the presence of a set of conditions (R) is determined before proceeding, with the conditions R including a verification of an unchanged location or position of the forehead impact point 17A, along with maintenance of a simultaneous touch of the forehead impact point 17A and the secondary impact point 117 on the vehicle surface 26, 126. If the position of the forehead impact point 17A has not changed and if simultaneous touch or contact of the points 17A, 117 has been maintained with the surface 26, 126, the method 100 proceeds to step 115. Otherwise, i.e., if either condition has changed, the method 100 proceeds to step 116.

At step 115, the presence of a set of conditions (S) is determined before proceeding. The set of conditions S determines whether a combination of horizontal and vertical angles exists as specified in §8.13.4 of FMVSS201, at which the impact point 17A can contact the targeted vehicle surface 26, 126. If so, the method 100 proceeds to step 120. Otherwise, the method 100 proceeds to step 119.

At step 116, the required translation of the template portion 16 of the AHT 10 is maintained using the dial 18 (see FIG. 1). That is, to maintain the required translation of the facial template 16 of the AHT 10, the dial 18 can be rotated or adjusted so that the setting or demarcation 20 of the dial 18 matches the demarcation 15 corresponding to the impact point 17 of the FIZ 14. By way of example, if the forehead impact point 17 corresponds to a demarcation having an assigned number of "7" on the FIZ 14, a position that can be determined by viewing the forehead impact point 17 through the substantially transparent material of the FIZ 14, the dial 18 is rotated until the demarcation 20 is also set to "7" to thereby move the facial template 16 sufficiently to maintain the required translation and regulated FMH backoff requirement. Once the translation of the facial template 16 is adjusted in this manner, the method 100 proceeds to step 118.

At step 118, the preliminary vertical angle ($\theta_V$) is readjusted until simultaneous contact is established between the forehead impact point 17 and the secondary impact point 117 of the facial template 16 with the respective vehicle surface 26, 126, as explained above. The algorithm 100 then proceeds to step 114.

At step 119, the center of the target, i.e., the center of the vehicle surface 26, 126, is moved to any location within a sphere having a radius of 25 mm, as set forth in FMVSS201. As required by that standard, such a sphere must remain centered on the center of the original target. The method 100 then repeats step 114.

At step 120, the AHT 10 is removed from the launch arm 70 and replaced with the FMH (not shown) actually used in the course of the impending crash test. Upon completion of step 120, the crash test is ready to commence.

Figure 4:
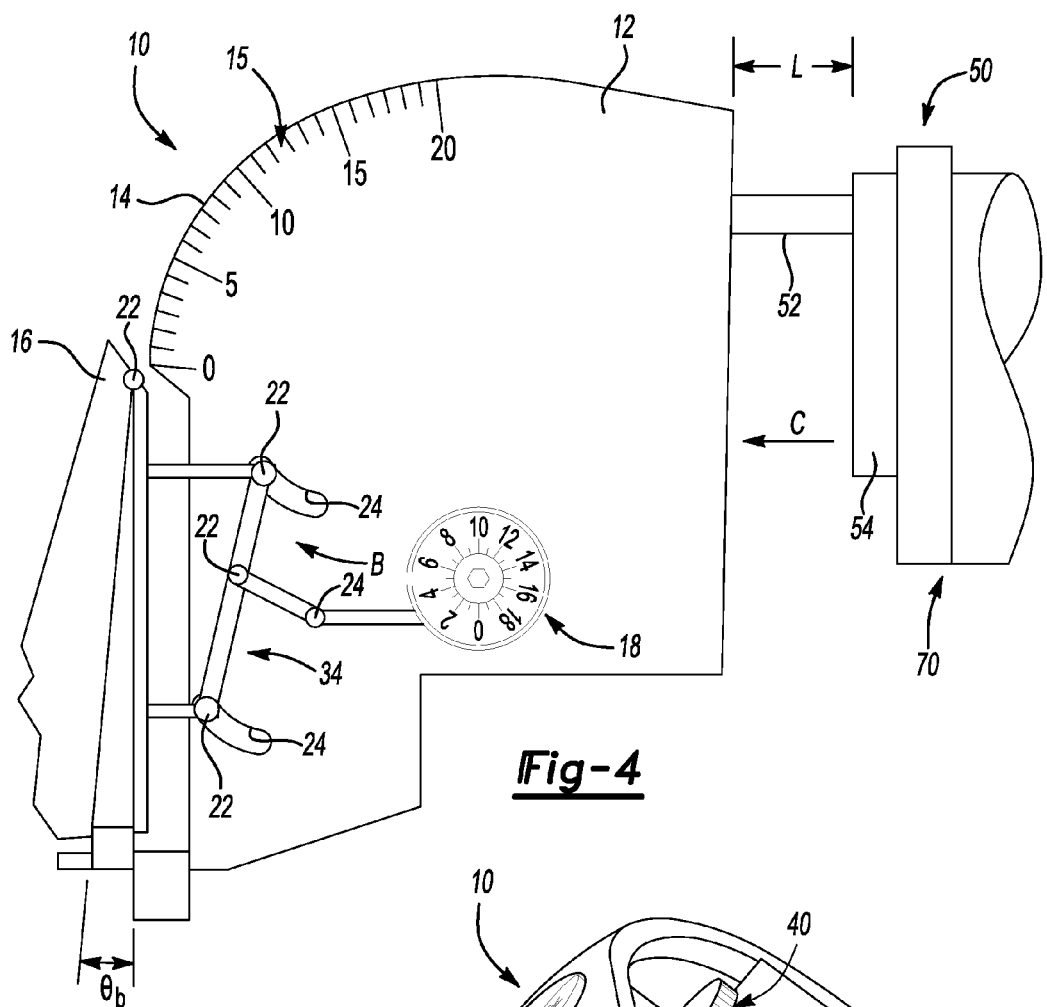
FIG. 4 is a schematic illustration of the 3D AHT of FIG. 1.

Referring to FIG. 4, the AHT 10 includes the adjustable linkage assembly 34, as noted above, which is connected to each of the dial 18 and the facial template 16. A rotation of the dial in the direction of arrow A ultimately moves the linkage assembly 34 in the direction of arrow B to thereby displace the facial template 16 from the cranial portion 12. The linkage assembly 34 includes the guide pins 22 described above with reference to FIG. 1, which are disposed within the guide slots 24 so as to move freely therewithin as needed.

Also as shown in FIG. 4, the AHT 10 is connected to a plate 54 via a rod or shaft 52 having a length L, which is closely calibrated and determined according to FMVSS201. The plate 54 can be connected to the launch arm 70. Thus, when the AHT 10 is replaced with the FMH (not shown) prior to conducting the actual head impact test, the plate 54 is disconnected from the launch arm 70, and the FMH is connected thereto using the positioning data determined using the AHT 10 as set forth above.

Figure 5:
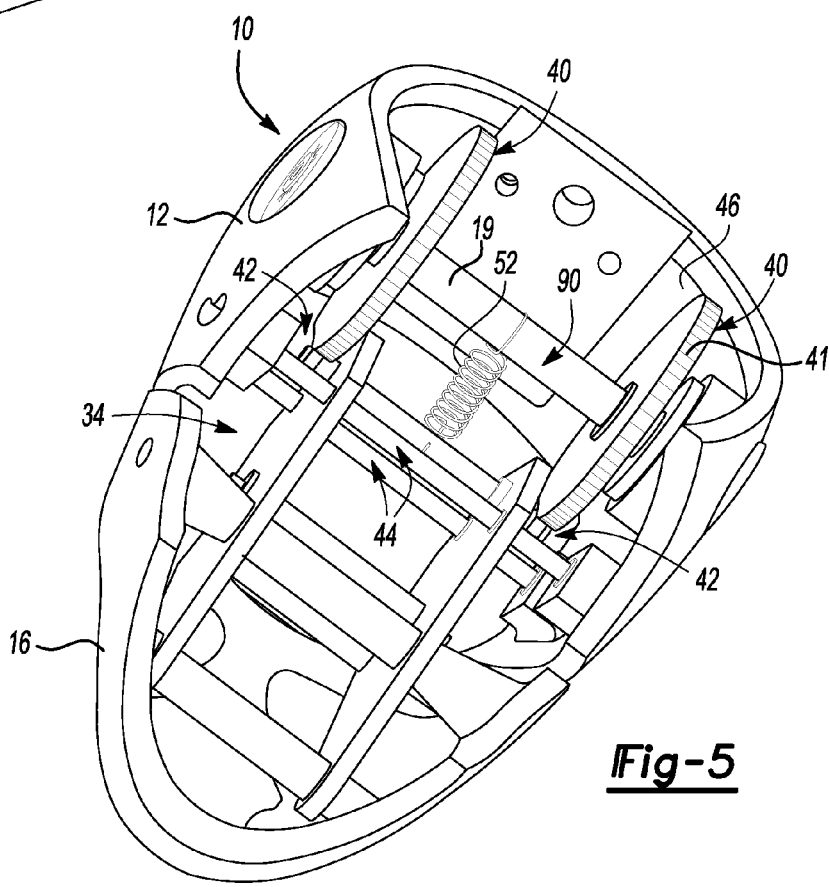
FIG. 5 is a perspective view of an exemplary adjustable linkage usable with the 3D AHT of FIG. 1.

Referring to FIG. 5, the AHT 10 includes an interior wall 46 defining a cavity, noted generally by arrow 90. The linkage assembly 34 is positioned substantially within the cavity 90. In the exemplary embodiment of FIG. 5, the linkage assembly 34 is configured as a cam assembly having a pair of cams 40 each with a plurality of equally-spaced splines or teeth 41. The cams 40 are interconnected via the cam shaft 19, which in turn is directly connected to the dial 18 so as to rotate in conjunction therewith. A cam follower or roller 42 and a plurality of guide followers 44 extend laterally across the cavity 90. A suitable return device 53, such as a coil spring as shown in FIG. 5, can be positioned between the cam shaft 19 and the roller 42 so that the facial template 16 remains sufficiently spring-loaded against the cams 40.

When the dial 18 is rotated, the cams 40 rotate over the distance between adjacent teeth 41, i.e., one "click". The cams 40 push the roller 42, which in turn guides the facial template 16 around the guide followers 42. Thus, using the positioning procedure provided by the method 100 in conjunction with the AHT 10 described above, a controlled angular position of the template 16 can be locked or retained, thus ensuring repeatability of the settings over multiple tests while minimizing the effects of operator bias in preparation for a vehicle crash test.

Figure 6A:
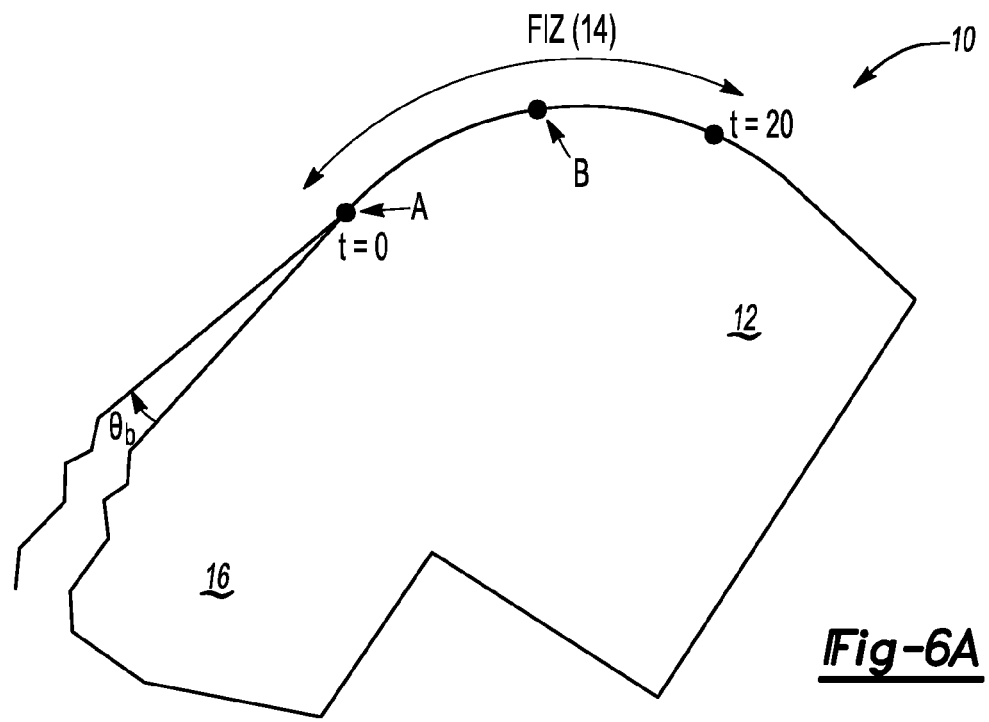
FIG. 6A is a schematic illustration of the AHT that is annotated for determining a translation of the facial template.
Figure 6B:
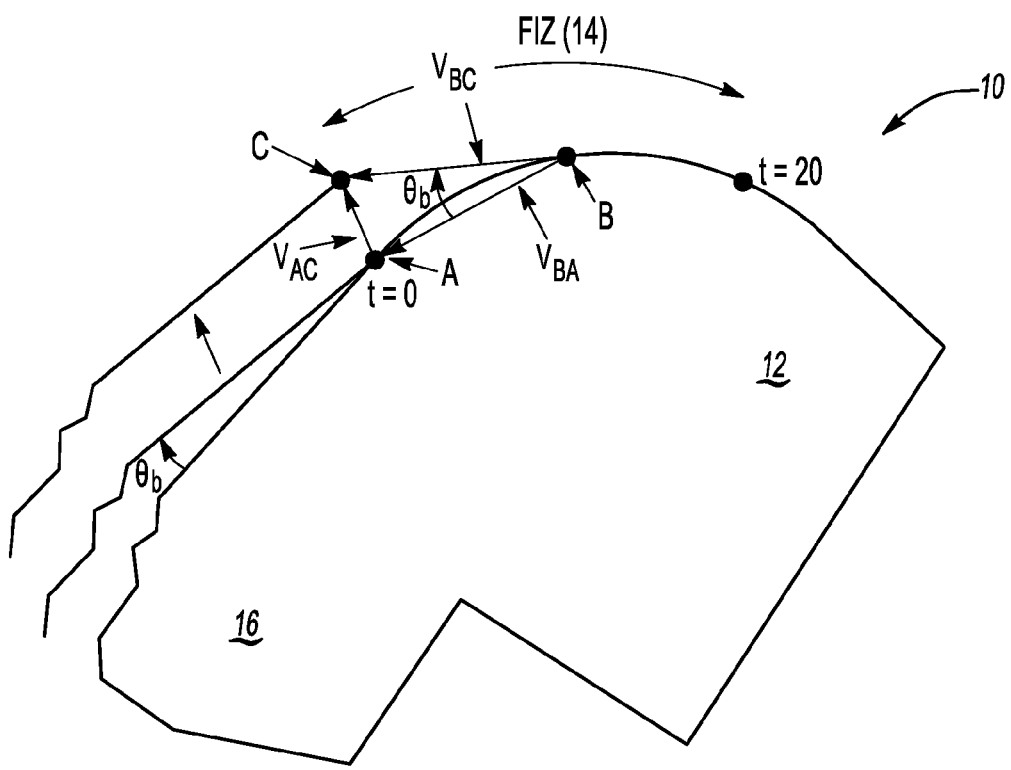
FIG. 6B is another schematic illustration of the AHT that is annotated for determining a translation of the facial template.

Referring to FIGS. 6A and 6B, as noted above the geometry of the guide slots 24 is essential to the accurate translation of the template 16. Any number of mathematical equations could be used to configure the guide slots 24 to precisely ensure proper translation of the template 16, and while an example is provided herein for illustrative purposes, configuration of the guide slots 24 is not limited to the embodiment of FIGS. 6A and 6B. The impact zone 14 of FIGS. 1 and 4 are referred to in FIGS. 6A and 6B as the forehead impact zone or FIZ.

With reference to FIG. 6A in particular, the FIZ 14 can be defined as a function of a positional parameter t, wherein t=0 at the bottom of the FIZ 14 and t=20 at the top of the FIZ 14. A determination is made as to the path the facial template 16 as a particular forehead impact point on the FIZ 14 moves from t=0 to t=20. Since the facial template 16 does not rotate as the position of the forehead impact point changes, all points on the facial template 16 follow the same path. The path that the facial template 16 follows also coincides with the path of the guide slot 24 (see FIG. 1).

If the forehead impact point is located at the bottom of the FIZ, i.e., at t=0 as indicated by the point A, then the top of the facial template 16, which is coincident with the bottom of the FIZ 14, does not move when the facial template 16 is rotated about the forehead impact point. However, if the forehead impact point is at the top of the FIZ 14, i.e., t=20, the facial template 16 will rotate about this point. In both cases, the facial template 16 will have the same orientation.

Referring to FIG. 6B, the new position of the facial template 16 is determined after it is rotated by the backoff angle ($\theta_b$) about the forehead impact point B, also shown in FIG. 6A. A clockwise rotation of a vector is accomplished by matrix multiplication, i.e., $V_{BC} = RV_{BA}$, where:

$$R = \begin{bmatrix} \cos\theta_b & \sin\theta_b \\ -\sin\theta_b & \cos\theta_b \end{bmatrix}, \text{ and } V_{BA} = \begin{Bmatrix} x_A - x_B \\ y_A - y_B \end{Bmatrix} = \begin{Bmatrix} -x_B \\ -y_B \end{Bmatrix}$$

where $(x_A, y_A)$ and $(x_B, y_B)$ are the Cartesian coordinates of points A and B, respectively, and point A is defined to be at the origin, i.e., $(x_A, y_A) = (0,0)$. The movement of the facial template 16 is defined by the vector $V_{AC}$, which can be calculated via vector subtraction as: $V_{AC} = V_{BC} - V_{BA}$. Therefore, from the above equations:

$$V_{AC}(t) = \begin{bmatrix} \cos\theta_b & \sin\theta_b \\ -\sin\theta_b & \cos\theta_b \end{bmatrix} \begin{Bmatrix} -x_B \\ -y_B \end{Bmatrix} -$$

$$\begin{Bmatrix} -x_B \\ -y_B \end{Bmatrix} = \begin{bmatrix} 1-\cos\theta_b & -\sin\theta_b \\ \sin\theta_b & 1-\cos\theta_b \end{bmatrix} \begin{Bmatrix} x_B \\ y_B \end{Bmatrix}$$

This equation defines the translation of the facial template 16 that results when the facial template 16 is rotated about point B on the FIZ 14. The translation of the facial template 16 depends on the coordinates of the point B. In order to precisely determine the coordinates of all points on the FIZ 14, a laser scan or other suitable means can be performed on the AHT 10. A least-squares-fit or other suitable data fitting technique can then be performed on the resulting coordinate data to give an equation for the coordinates of the points on the FIZ 14, i.e., $$\begin{Bmatrix} x_B(t) \\ y_B(t) \end{Bmatrix} = \begin{Bmatrix} 1.345t + 0.104t^2 \\ 5.256t - 0.097t^2 \end{Bmatrix}$$

where t is a parameter that defines the location or demarcation of the forehead impact point B as the normalized distance between the lower and upper extents of the FIZ 14, i.e., t=0 at the bottom of the FIZ 14 and t=20 at the top.

Substitution of the above equations results in:

$$V_{AC}(t) = \begin{bmatrix} 1 - \cos\theta_b & -\sin\theta_b \\ \sin\theta_b & 1 - \cos\theta_b \end{bmatrix} \begin{Bmatrix} 1.345t + 0.104t^2 \\ 5.256t - 0.097t^2 \end{Bmatrix}$$

which defines the change in the translation of the facial template 16 as the impact point on the FIZ 14 moves from the bottom of the FIZ 14 (t=0) to the top of the FIZ 14 (t=20). Since the guide slots 24 (see FIG. 1) of the cranial portion 12 of the AHT 10 also define the change in the translation of the facial portion 12 as the impact point moves from t=0 to t=20, the shape of the guide slots 24 can be defined by the equation appearing immediately above.

Figure 7:
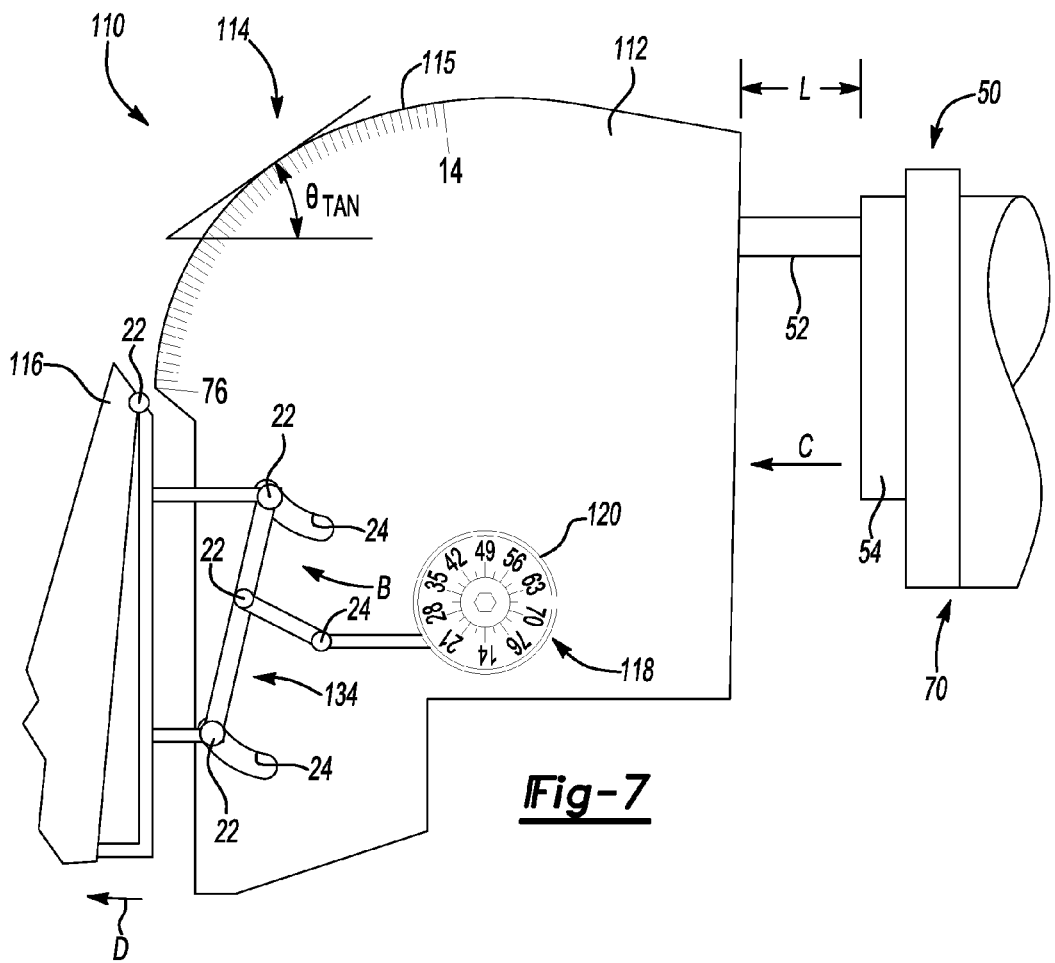
FIG. 7 is a schematic illustration of another embodiment of the 3D AHT of FIG. 1.

Referring to FIG. 7, an AHT 110 having an adjustable backoff angle provides an alternate embodiment to that of the AHT 10 described above. The backoff angle ($\theta_b$) is adjustable between 0 degrees and a calibrated maximum angle, for example the 5 degrees or 10 degrees as currently set forth in FMVSS201, or another desired angle. The AHT 110 includes a cranial portion 112, a facial template 116, a FIZ 114 having a set of demarcations 115, an adjustable linkage assembly 134, and a dial 118 having a corresponding set of demarcations 120. In one exemplary embodiment, the range of angular values of the demarcations 115 and 120 is 14 degrees to 76 degrees, although other values can be used without departing from the intended scope of the invention.

While not show in FIG. 7 for simplicity, the AHT 110, like the AHT 10 shown in FIG. 4, is connected to a plate 54 and a shaft 52, and also can be selectively connected to a launch arm 70. Thus, once properly positioned the AHT 110 can be removed from the launch arm 70 and replaced with the FMH (not shown) prior to conducting the actual head impact test, with the plate 54 being disconnected from the launch arm 70, and the FMH being connected thereto using the positioning data determined using the AHT 110 as set forth above.

Before proceeding with a discussion regarding use of the AHT 110 of FIG. 7, it is noted that FMVSS201 requires that the FIZ 114 remains in contact with the target point on the vehicle surface during rotation of the backoff angle. As will be understood by one of ordinary skill in the art, when two bodies are in contact with each other, the tangents to the impacting surfaces at the impact point must be equivalent. Therefore, when the AHT 110 is rotated through the backoff angle ($\theta_b$) (see FIG. 10B), the tangents of all points on the FIZ 114 are changed by, for example, 5 degrees for a 5 degree backoff angle ($\theta_b$). This means that the original or pre-backoff impact point on the FIZ 114 can no longer be in contact with the target surface at the target impact point.

Instead, the AHT 110 must slide along the target surface as it is rotated in order to maintain contact with the target surface target point, and a different point on the FIZ 114 will then be placed in contact with the surface target point at the end of the backoff angle rotation. In order for this post-backoff target point to have a post backoff surface tangent equivalent to the target surface tangent, its pre-backoff surface tangent must have been 5 degrees smaller than the pre-backoff surface tangent of the original FIZ impact point, in the example of a backoff angle of 5 degrees.

Therefore, if the FIZ 114 is demarcated by integer values of its surface tangent ($\theta_{TAN}$), a method or procedure can be used to set up the FMH test that does not require iteration because the final or post backoff location of the FIZ impact point can be directly calculated. Such a method or procedure is explained below with reference to FIG. 9. However, it must first be established how to locate marks or demarcations on the FIZ 114 that correspond to integer values of the surface tangent ($\theta_{TAN}$).

The coordinates of a point "B" on the centerline of the FIZ 114 are given by:

$$\begin{Bmatrix} x_B(t) \\ y_B(t) \end{Bmatrix} = \begin{Bmatrix} 1.345t + 0.104t^2 \\ 5.256t + 0.097t^2 \end{Bmatrix}$$

where $0 \leq t \leq 20$. The tangent to the centerline of the FIZ 114 can be expressed in the form of:

$$y' = \frac{dy}{dx} = \left(\frac{dy}{dt}\right) \bigg/ \left(\frac{dx}{dt}\right) = \left(\frac{5.256 - 0.194t}{1.345 + 0.208t}\right)$$

$$t = \frac{5.256 - 1.345y'}{0.194 + 0.208y'}$$

Figure 8:
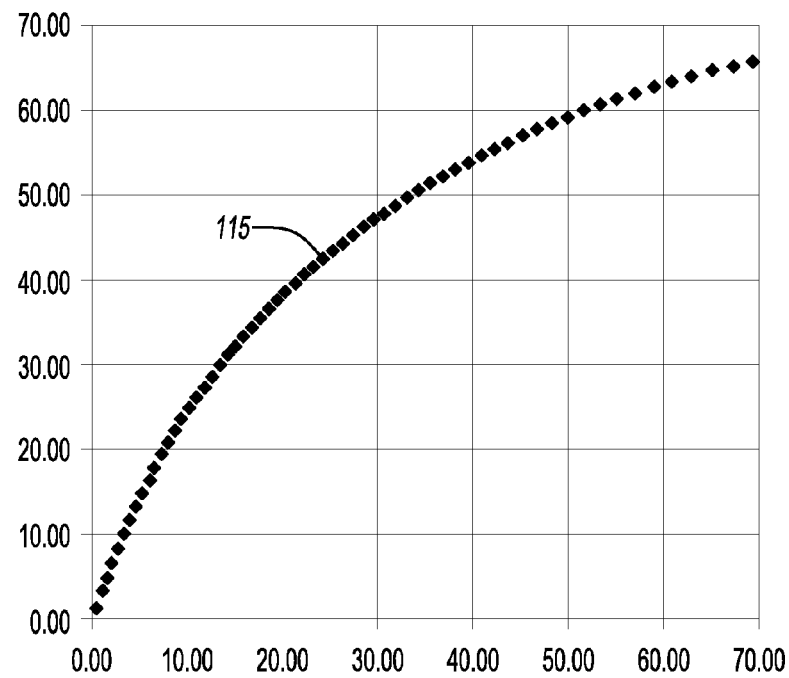
FIG. 8 is a graph describing a set of demarcations usable with the 3D AHT of FIG. 7.

Note that if the angle $\theta_{TAN}$ of a line tangent to the centerline of the FIZ 114 at the point B is given, the tangent to the centerline at the point B can be calculated directly as $y'=\tan(\theta_{TAN})$. That is, for a known tangent angle ($\theta_{TAN}$) one could inversely calculate the corresponding values of t, $x_B$ and $y_B$ using the above equation set. The demarcations 115 can be marked on the centerline of the FIZ 114, with one degree per demarcation, as shown in FIG. 8. As shown in FIG. 8, unlike the demarcations 15 shown in FIG. 1, the spacing of the demarcations 115 is not identical along the length of the FIZ 114, and are generally closer together or compressed near the center of the range.

Referring once again to FIG. 7, the tangent angle ($\theta_{TAN}$) ranges from 76 degrees at t=0, to 14 degrees at t=20. The location of the demarcations 115 on the FIZ 114 can be found by setting the value of the tangent angle ($\theta_{TAN}$) to integer values ranging from 76 degrees to 14 degrees and using the above equations. This gives the values of t where the demarcations 115 should be placed on the FIZ 114, with each demarcation indicating a 1 degree change in the tangent angle ($\theta_{TAN}$) relative to the previous demarcation. The procedure or method 200 of FIG. 10 can then be used to position an FMH using the AHT 110 of FIG. 7.

Figure 9:
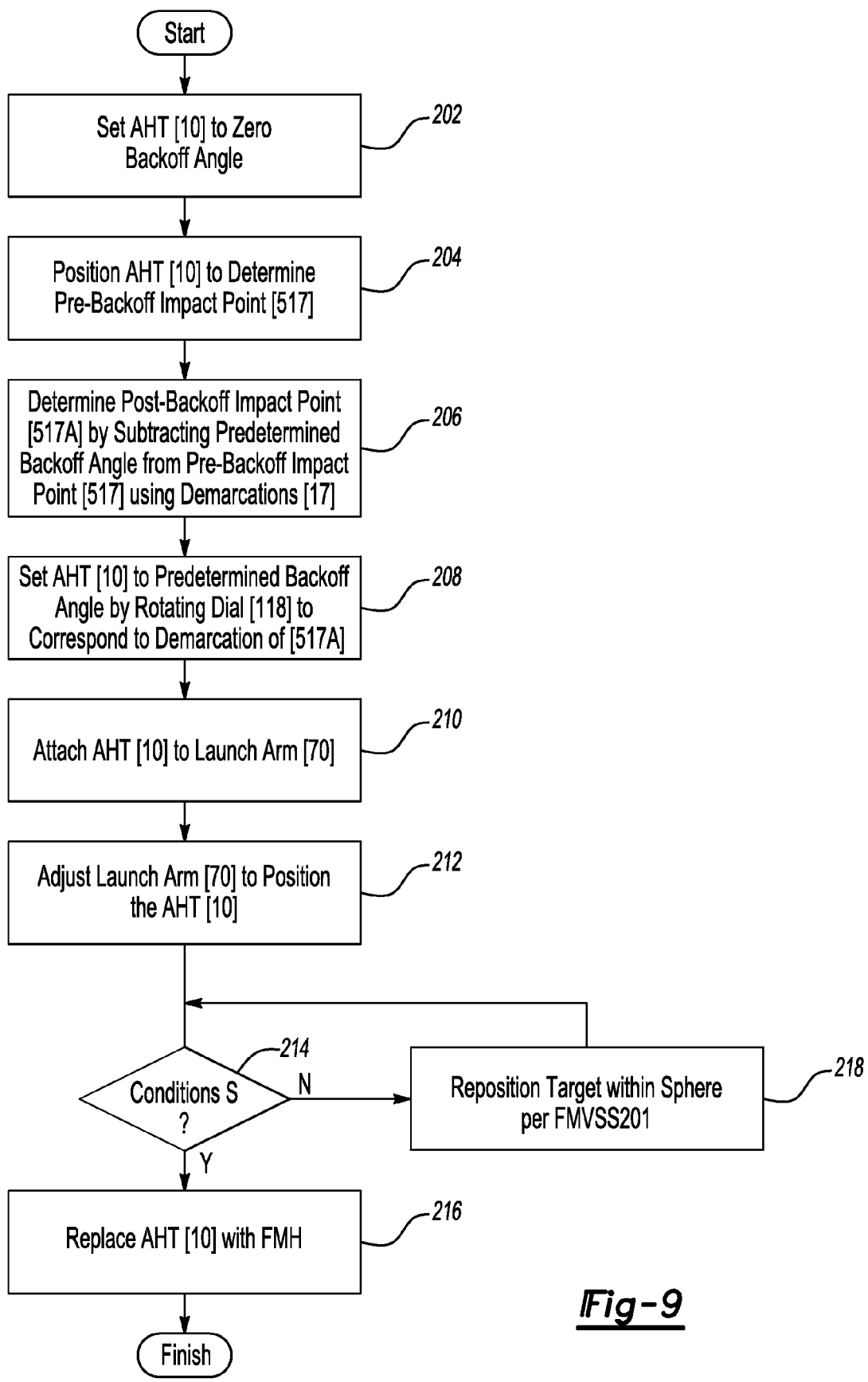
FIG. 9 is a graphical flow chart describing a method for positioning an FMH using the 3D AHT of FIG. 7.
Figure 10A:
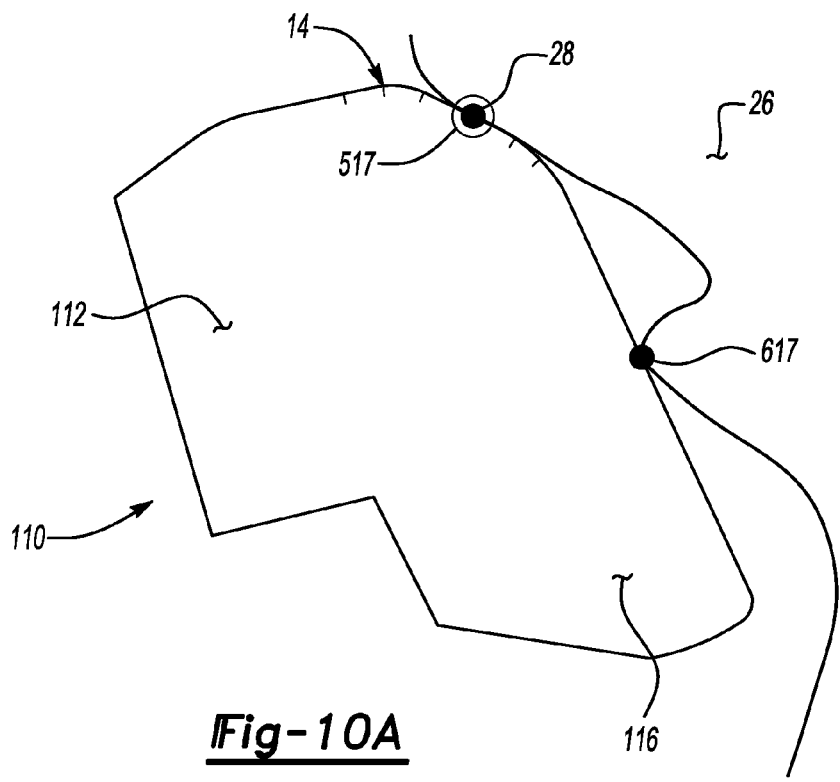
FIG. 10A is a schematic illustration of the 3D AHT of FIG. 7 being positioned with respect to a target vehicle surface.
Figure 10B:
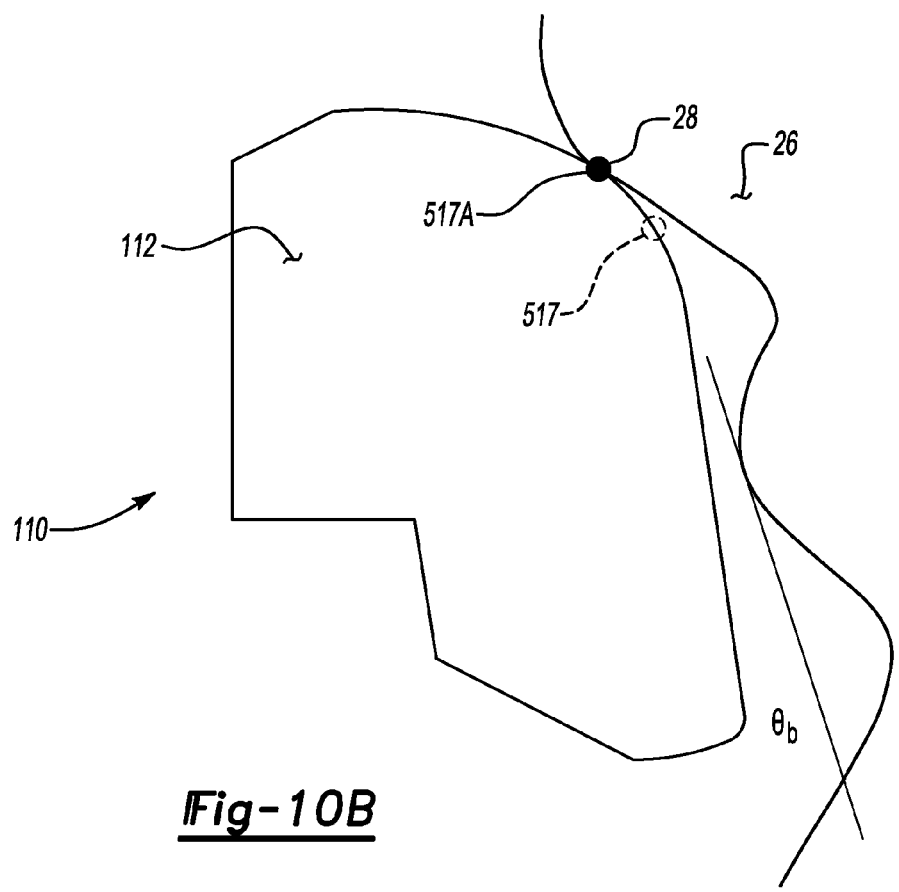
FIG. 10B is another schematic illustration of the 3D AHT of FIG. 7 being positioned with respect to the target vehicle surface shown in FIG. 10A.

Referring to FIG. 9, and with reference to the structure shown in FIGS. 7, 10A, and 10B, a method or algorithm 200 is provided for positioning an FMH (not shown) for a crash test using the alternate AHT 110 of FIG. 7.

At step 202, the facial template 116 of the AHT 110 is set or positioned in order to establish a zero degree backoff angle ($\theta_b$). The method 100 then proceeds to step 204.

At step 204, the AHT 110 is positioned with respect to the vehicle surface 26 to determine a pre-backoff impact point 517. As shown in FIG. 10A, positioning of the AHT 110 requires simultaneous contact between the vehicle surface 26 and each of the impact point 517 and a secondary impact point 617. The method 200 then proceeds to step 206.

At step 206, as shown in FIG. 10B a post-backoff impact point 517 on the FIZ 114 is determined by subtracting 5 degrees, 10 degrees, or another corresponding angular value if a different backoff angle is used, from the pre-backoff impact point 517 using the demarcations 115 (see FIG. 8) on the FIZ 114. Once the post-backoff impact point 517 is determined in this manner, the method 200 then proceeds to step 208.

At step 208, the AHT 110 is set to a predetermined backoff angle, e.g., 5 degrees, 10 degrees, or another suitable angular value, which can be accomplished by rotating the dial 118 until the demarcation 120 thereon correspond to the demarcation 115 of the FIZ 114. As shown in FIG. 10B, the subtraction of the required backoff angle shifts the position of the pre-backoff impact point 517 to a new position, i.e., 517A. Once set, the method 200 proceeds to step 210.

At step 210, the AHT 110 is attached to the launch arm 70, which is then adjusted at step 212 if necessary. Step 210 is comparable to steps 108-112 as set forth above. That is, the preliminary vertical angle ($\theta_V$) of the AHT 110 is measured and recorded, and the launch arm 70 (see FIG. 4) is programmed or set using the preliminary vertical angle ($\theta_V$). The AHT 110 is then connected to or positioned into the launch arm 70, and the preliminary vertical angle ($\theta_V$) is verified. Any necessary adjustment or iteration of the launch arm 70 can occur at this point. The method 200 then proceeds to step 214.

At step 214, a set of conditions (S) is examined to determine if there is a combination of horizontal and vertical angles specified in §8.13.4 of FMVSS201 at which the post-backoff impact point 517 can contact the vehicle surface 26. If so, the method 200 proceeds to step 216. Otherwise, the method 200 proceeds to step 218.

At step 216, the AHT 110 is replaced with the FMH (not shown) actually used in the course of the impending crash test. Upon completion of step 216, the crash test is ready to commence.

At step 218, as set forth in FMVSS201 the center of the vehicle surface 26 acting as the target is moved to any location within a sphere having a radius of 25 mm, centered on the center of the original targeted vehicle surface. The method 200 then repeats step 214.

While the best modes for carrying out the invention have been described in detail, those familiar with the art to which this invention relates will recognize various alternative designs and embodiments for practicing the invention within the scope of the appended claims.

The invention claimed is:

1. An adjustable head tool (AHT) for positioning a free motion headform (FMH) having a regulated FMH backoff requirement prior to an impact between the FMH and a vehicle surface having a target point, the AHT having a backoff angle relative to the position of the target point, the AHT comprising:
   a cranial portion at least partially enclosing a linkage assembly;
   an adjustable facial template that is connected to the linkage assembly; and
   a dial configured for selectively translating the adjustable facial template with respect to a selected primary impact point on the cranial portion to thereby achieve the regulated FMH backoff requirement while maintaining the backoff angle relative to the target point.

2. The AHT of claim 1, wherein the cranial portion substantially encapsulates the linkage assembly, and wherein the facial template is configured as a facial model having at least one human facial feature.

3. The AHT of claim 1, wherein the cranial portion includes a designated forehead impact zone (FIZ) including an identical external contour as a FIZ of the FMH, and further including a first set of demarcations, and wherein the dial has a second set of demarcations corresponding to the first set of demarcations on the FIZ.

4. The AHT of claim 1, wherein the linkage assembly includes a pair of cams that are interconnected by a cam shaft, and wherein a rotation of the dial rotates each of the cams and the camshaft.

5. The AHT of claim 1, wherein the backoff angle is one of a built-in backoff angle and a variable backoff angle.

6. The AHT of claim 5, wherein the backoff angle is the variable backoff angle, and wherein the variable backoff angle has a value greater than approximately 5 degrees.

7. An adjustable head tool (AHT) for positioning a free motion headform (FMH) having a regulated FMH backoff requirement prior to an impact between the FMH and a target surface having a target point, the AHT having a backoff angle relative to the position of the target point, the AHT comprising:
   a cranial portion encapsulating a linkage assembly and having a designated forehead impact zone (FIZ) with a first set of demarcations;
   a facial template positioned adjacent to the cranial portion and adapted to move with respect to the cranial portion, the facial template being connected to the linkage assembly; and
   a dial having a second set of demarcations each corresponding to a demarcation of the second set of demarcations, wherein a rotation of the dial selectively translates the facial template with respect to a selected primary impact point on the FIZ to thereby achieve the regulated FMH backoff requirement while maintaining the backoff angle relative to the target point.

8. The AHT of claim 7, wherein the linkage assembly includes a cam assembly having a pair of cams interconnected by a cam shaft, and wherein a rotation of the rotatable dial rotates the cam shaft and the pair of cams.

9. The AHT of claim 7, wherein the FIZ is constructed of a transparent material that is configured to allow the target point to be visible through the FIZ from a rear of the AHT.

10. The AHT of claim 7, wherein the cranial portion defines a plurality of guide slots, and wherein the adjustable linkage assembly includes a plurality of guide pins that are each variably positionable within a respective one of the plurality of guide slots.

11. The AHT of claim 10, wherein the backoff angle is a built-in backoff angle having a value of one of: approximately 5 degrees and approximately 10 degrees.

12. An adjustable head tool (AHT) for positioning a free motion headform (FMH) having a regulated FMH backoff requirement prior to an impact between the FMH and a target surface having a target point, the AHT having a backoff angle relative to the position of the target point and comprising:
   a cranial portion at least partially enclosing a linkage assembly, the cranial portion defining a plurality of guide slots and having a forehead impact zone (FIZ) with a first set of demarcations;
   an adjustable facial template connected to the linkage assembly, the linkage assembly having a plurality of guide pins that are moveable within the guide slots to allow translation of the adjustable facial template relative to the cranial portion; and a dial having a second set of demarcations corresponding to the first set of demarcations, wherein a rotation of the dial moves the guide pins within the guide slots and translates the facial template with respect to a select primary impact point on the cranial portion to thereby achieve the regulated FMH backoff requirement while maintaining the backoff angle relative to the target point.

13. The AHT of claim 12, wherein the facial template defines each of a nose portion, a lip portion, and a chin portion.

14. The AHT of claim 12, wherein the backoff angle is built-in.

15. The AHT of claim 12, wherein the backoff angle is variable.

* * * * *